United States Patent [19]
Danish et al.

[11] Patent Number: 5,339,358
[45] Date of Patent: * Aug. 16, 1994

[54] TELEPHONE KEYPAD MATRIX

[75] Inventors: Adel Danish, Cairo, Egypt; Sherif Danish, Foster City; Kris W. Kimbrough, Redwood City, both of Calif.

[73] Assignee: Danish International, Inc., Sunnyvale, Calif.

[ * ] Notice: The portion of the term of this patent subsequent to May 26, 2009 has been disclaimed.

[21] Appl. No.: 888,738

[22] Filed: May 26, 1992

Related U.S. Application Data

[63] Continuation-in-part of Ser. No. 500,370, Mar. 28, 1990, Pat. No. 5,117,455.

[51] Int. Cl.$^5$ ............................................. H04M 1/00
[52] U.S. Cl. ..................................... 379/368; 379/100; 379/355; 379/387; 379/94; 379/95; 341/22; 341/28; 341/20; 341/23
[58] Field of Search ............... 379/368, 354, 373, 376, 379/165, 94, 95, 355, 387, 100; 341/22, 28

[56] References Cited

U.S. PATENT DOCUMENTS

| | | | |
|---|---|---|---|
| 4,490,056 | 12/1984 | Whitaker | 341/22 |
| 4,609,792 | 9/1986 | Levasseur | 341/22 |
| 4,737,980 | 4/1988 | Curtin et al. | 341/22 |
| 5,040,209 | 8/1991 | Greenberg | 379/387 |
| 5,117,455 | 5/1992 | Danish et al. | 379/368 |

Primary Examiner—James L. Dwyer
Assistant Examiner—Jacques M. Saint-Surin
Attorney, Agent, or Firm—James E. Eakin; Janet Kaiser Castaneda

[57] ABSTRACT

A method and apparatus for the conversion of a standard push button telephone keypad into a data entry terminal permitting full alphanumeric DTMF entry through a telephone system to a file server for delivery to a service provider computer. The alphabetical letters are prearranged to enable single or adjacent keypairs to be defined for each alphabetical letter. DTMF signals are generated by the keypairs and are transmitted to conventional voice tone recognition apparatus and storage facilities of the central computer for later or simultaneous delivery to a service provider computer such as a facsimile machine, an E-mail system, a paging system, and/or any data base connected to a telephone line.

4 Claims, 9 Drawing Sheets

TELEPHONE KEYPAD MATRIX

RELATED APPLICATIONS

The present application is a continuation-in-part of U.S. patent application Ser. No. 07/500,370, filed on Mar. 28, 1990, now U.S. Pat. No. 5,117,455, issued on May 26, 1992.

FIELD OF THE INVENTION

The present invention relates to the use of a conventional telephone keypad with a telephone keypad matrix as a data terminal for inputting alphanumeric characters into a computer system via a telephone line which, in turn, forwards the message from the data terminal to a service provider computer, such as a paging system, facsimile device, E-Mail and/or voice mail system computer.

BACKGROUND OF THE INVENTION

Automatic response function general messaging systems, computerized systems, are designed to process incoming calls from pay or non-pay calling stations. Such systems are typically accessed and controlled through a telephone line. An incoming call is received from the telephone system and processed by the general message system computer, or processing may be initiated by the telephone system computer. Processing procedures may prompt the caller to select a desired service by pressing numeric keys on the telephone keypad. Selection of a service causes the service provider computer to typically continue processing the call, or the message system computer may process the call and store the message for later delivery to the selected service.

The identity of each numerical key is determined from an analog, dual tone multifrequency signal (DTMF) which is generated upon depressing the numerical key. The DTMF is a combination of two analog voice frequency tones, and it addresses stored digital code. Timing is typically not critical in the entry of DTMF signals for the identification of the numerals of standard, numerical keys. The telephone system computer, or the message system computer, converts the analog DTMF tones into digital signals for processing. The computer may also convert digital signals into analog voice signals for providing acknowledgement/prompt messages to the caller.

For example, by pressing the numeral 1 on the keypad in response to a computerized voice prompt, the caller may be connected from a messaging computer to a computer for a facsimile machine.

Computerized telephone systems and general message systems, typically file servers, may also eliminate voice communication and require the caller to communicate exclusively through the telephone keypad. In one such application wherein a caller desires that information be delivered by facsimile, the caller may press the number key corresponding to the number of the desired document and, upon entry of the start button or the receiving facsimile number, the document will be delivered.

Entry of the letters of the alphabet is desirable for communicating with automatic response function general messaging systems. For example, the caller's name, address, and/or code number are desirable information for input to a remote pager, a facsimile message, an E-Mail message system, or a bank computer to obtain an account balance.

The universally recognized standard for the push button telephone keypad is a 4×3 matrix having four rows and three columns of buttons, or keys. Each key is preassigned with a single digit or special symbol as a primary assignment, and with three alphabetic characters as a secondary functional assignment. While the universally recognized 4×3 keypad of the prior art standardizes the physical arrangement of the numeric characters, the physical arrangement of alphabetic characters may vary. One typical push button telephone matrix of the prior art includes twenty four letters of the alphabet, excluding the "Q" and the "Z" arranged on eight of the twelve keys as follows:

| | |
|---|---|
| KEY 1 | No letters |
| KEY 2 | ABC |
| KEY 3 | DEF |
| KEY 4 | GHI |
| KEY 5 | JKL |
| KEY 6 | MNO |
| KEY 7 | PRS |
| KEY 8 | TUV |
| KEY 9 | WXY |
| KEY 0 | No letters |
| KEY * | No letters |
| KEY # | No letters |

There are several methods of entering alphabetical characters using the conventional telephone keypad design outlined above. With the exception of Applicant's co-pending U.S. patent application No. 07/500,370, none of the methods provide for the DTMF signal entry of alphabetical characters, and timing of entry is critical in the first prior art method.

The first method requires the caller to locate the desired letter on the telephone keypad and to press the corresponding key either once, twice, or three times, depending upon the location of the desired letter on the key, followed by pressing an additional symbol key, such as the pound sign key, which operates as a signal code to indicate the desire to enter a character as opposed to a digit. This method is shown in the Hashimoto et al. U.S. Pat. No. 4,658,417. For example, to enter the name "JONES" using the Hashimoto method, the following steps are required:

| | | |
|---|---|---|
| "J" | KEY 5 | Press once |
|  | # KEY | Press once |
| "O" | KEY 6 | Press three times |
|  | # KEY | Press once |
| "N" | KEY 6 | Press two times |
|  | # KEY | Press once |
| "E" | KEY 3 | Press two times |
|  | # KEY | Press once |
| "S" | KEY 7 | Press three times |
|  | # KEY | Press once |

The first method does not permit the caller to enter digits and letters within the same word. The method is time critical in that pressing the Number 2 key three times in a row could provide for the input of the letters C, or AB, or BA, or AAA depending upon the timing between keystrokes. Because the number of keystrokes used to enter letters is not constant and a separate symbol key must be pressed before entry of the next desired letter, the caller is required to provide considerable concentration to correctly complete the desired entry.

A second method for entering letters of the alphabet requires the caller to locate and press the key bearing the desired letter and then to press the key bearing the numeral corresponding to the position of the desired letter on the key. For example, to enter the letter "H" the caller must first press the number four key which bears the letter "H", and must then press the number two key because the "H" is the "second" letter on the number four key. The following steps are required to enter the name "JONES" using the second method:

| | |
|---|---|
| KEY 5 | Press once |
| KEY 1 | Press once (Pause) |
| KEY 6 | Press once |
| KEY 3 | Press once (Pause) |
| KEY 6 | Press once |
| KEY 2 | Press once (Pause) |
| KEY 3 | Press once |
| KEY 2 | Press once (Pause) |
| KEY 7 | Press once |
| KEY 3 | Press once |

Although the second method standardizes the number of keystrokes for each letter, it requires considerable concentration by the caller to properly complete the required keystrokes.

Applicant's co-pending U.S. patent application No. 07/500,370, filed on Mar. 28, 1990, now U.S. Pat. No. 5,117,455, issued on May 26, 1992, describes a novel method and apparatus for entering characters into a telephone system using a conventional telephone keypad. The method and apparatus described therein are suitable for using a telephone keypad as a data terminal to provide information to any messaging computer for delivery to a service provider computer, such as paging system computers, E-Mail system computers, facsimile equipment, bank computers, information depository computers, etc.

SUMMARY OF THE INVENTION WITH OBJECTS

A general object of the invention is to convert a telephone keypad into a data terminal enabling a user to easily input alphabetical, as well as numerical characters, into a the telephone for input to a computer which in turn accesses a service provider computer in a manner that overcomes the limitations and drawbacks of the prior art.

A specific object of the present invention is to provide a method and apparatus for the conversion of a standard telephone keypad into a data terminal for full alphanumeric DTMF entry capability into a messaging system computer for providing information to service provider computers.

One more object of the present invention is to provide a method and apparatus to enable the caller to enter a set of characters having both alphabetical and digital components from a telephone keypad into a computer of a messaging system.

Yet another object of the present invention is to provide an internationally standardized method and apparatus for the logical entry of alphabetical and numerical characters into a telephone handset for delivery to a messaging system computer for further processing by a service provider computer, or for processing and storage by the messaging system computer.

Yet one more object of the present invention is to enable a caller to apply a minimum of concentration while using a rapid, visually simple, method and apparatus for entering characters into a telephone handset in a manner that is dependent upon the physical location of the characters on the keypad, and is independent of the key labels.

In accordance with the present invention, a method and apparatus is provided for the conversion of a standard push button telephone keypad into a matrix affording the user full alphanumeric DTMF entry into a messaging system computer for delivery to a service provider computer. The method employs the standardized telephone matrix to prearrange the alphabetical letters in a manner enabling single or adjacent keypairs to be defined for each alphabetical letter. Each keypair for each alphabetical character is provided with a stored, binomial code. DTMF signals are generated by the single or adjacent keypairs and are transmitted to conventional voice tone recognition/prompting apparatus and storage facilities of a telephone system or a general messaging system.

A rectangular overlay matrix defines twelve openings for placement over the keys of a twelve key, standardized push button telephone keypad. The openings are arranged to correspond to the standard 4×3 keypad matrix.

The letters of the alphabet and enumerated special characters are individually and sequentially prearranged on the matrix so that the letters and characters are aligned above, to the left and to the right, and diagonally between the keys of the keypad. All characters are entered by sequentially pressing bidirectional DTMF keypairs. The two keystrokes required to enter the keypair defining a particular character are determined by the location of that character on the matrix. Alphabetical characters that are located adjacent to a single key are defined by a keypair that is entered by pressing said single key twice. Alphabetical characters and special characters located between and adjacent to two keys are defined by keypairs composed of said two keys, and are entered by sequentially pressing the two keys of the keypair in any order. Alphabetical characters and special characters located between and diagonally adjacent to four keys are defined by keypairs of any two diagonally adjacent keys, and are entered by pressing either of the keypairs in any order. To enter a digital character contained within an alphabetical character set, the corresponding digital key is pressed followed by the pressing of the "pound" sign key or, alternatively, by pressing any key that is located at least two rows or two columns distance from said digital key. Digital characters may also be entered followed by a pause of a duration sufficient to receive the voice tone "echo" prior to pressing keys to enter the next alphanumeric character in the set.

The entered characters are either stored by a messaging computer, typically a file server, for delivery to a service provider computer after the caller completes his/her entry and goes off hook, or the file server may directly forward information requested in the form of a message to the service provider computer and return an answer to the caller who remains on hook. If message delivery is not initially successful, the messaging computer redials the service computer a predetermined number of times until the message is either delivered or removed from the system.

These and other objects, aspects, advantages and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
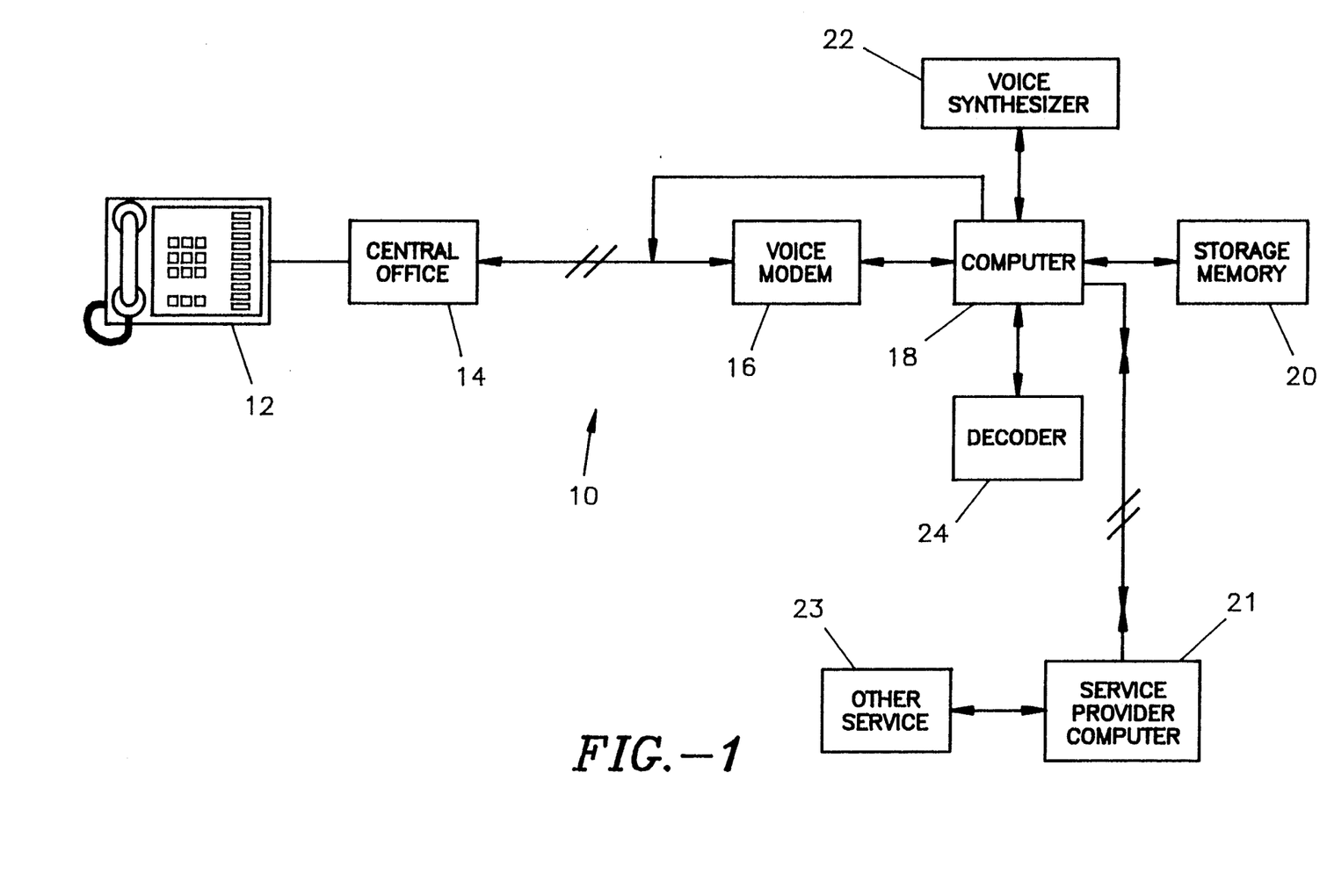
FIG. 1 is a block diagram of a conventional automatic response function telephone system having a 4×3 matrix telephone keypad connected through a central telephone office to a central computer through a voice modem. A voice synthesizer, decoder and storage memory are connected to the central computer which is, in turn, connected to a service provider computer, such as a facsimile machine, a paging system, an E-mail system, or a bank computer.

Referring now to FIG. 1, a preferred embodiment of the present invention is illustrated generally at 10. System 10 includes a user telephone hand set 12 connected through a telephone central office 14 to a conventional automatic response function computer 18, typically a file server, through a voice modem 16. The computer 18 is accessible from pay or non-pay calling stations, and the hand set 12 may be connected to a privately or centrally operated telephone office 14. The user telephone hand set 12, which is a typical twelve key, push button telephone having a 4×3 matrix keypad, includes the matrix 28 shown in FIG. 2. Pressing the keys on the hand set 12 produces voice, DTMF signals to identify the selected keys.

Figure 2:
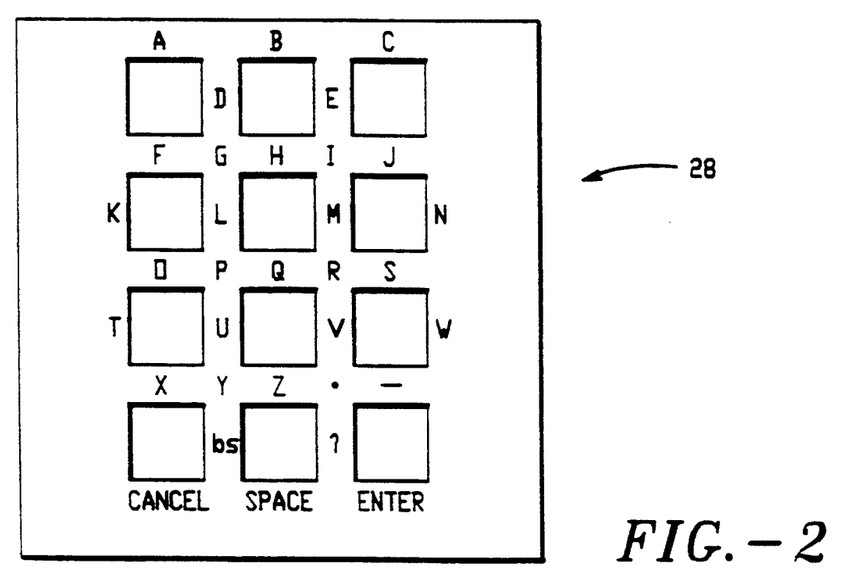
FIG. 2 is a top plan view of a matrix embodying the principles of the present invention.
Figure 3:
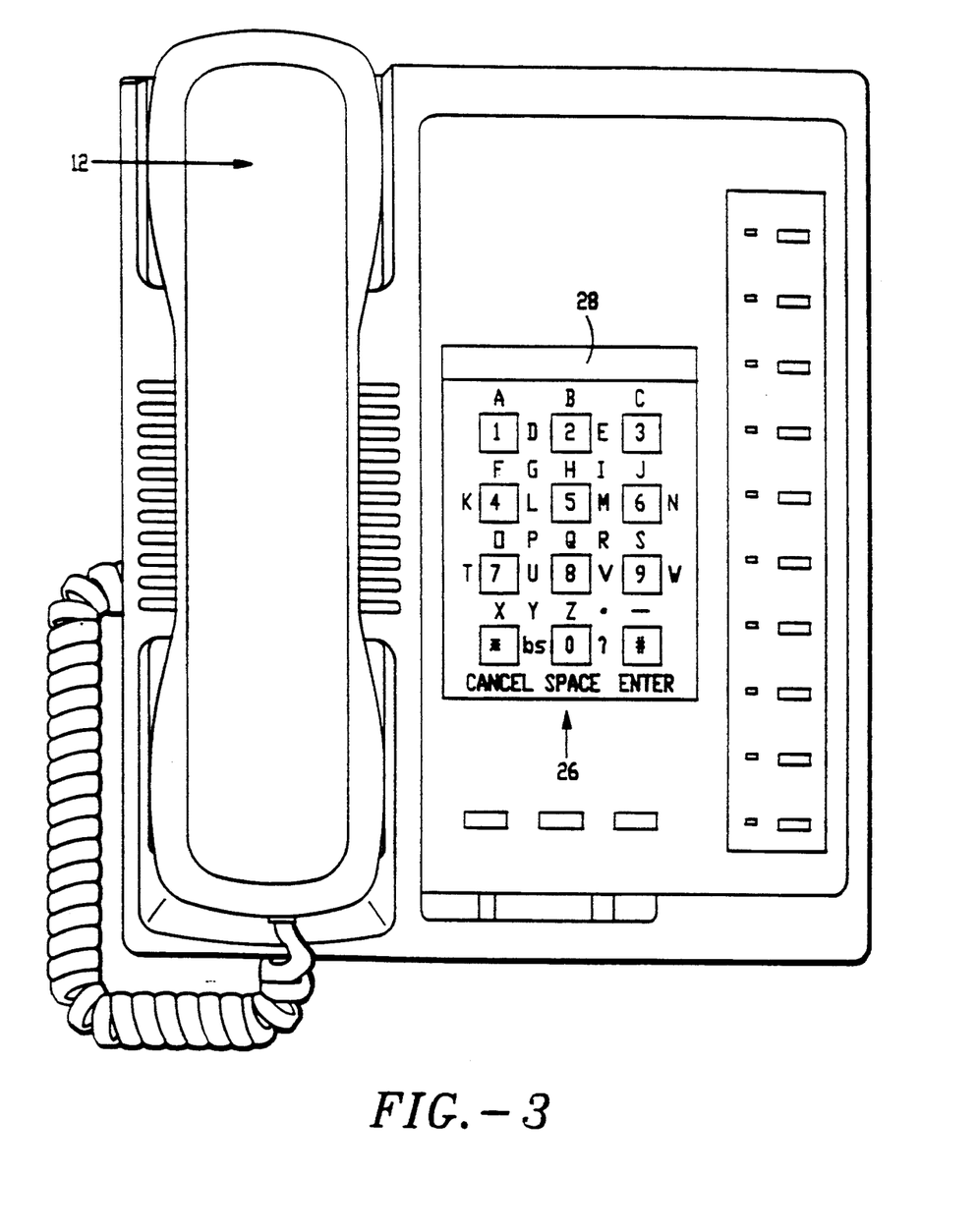
FIG. 3 is a top plan view of the matrix of the present invention shown positioned for use on a conventional push button telephone keypad.

Referring now to FIGS. 2 and 3, the hand set 12 is shown having a standardized twelve key, push button keypad 26. The twelve keys of keypad 26 are arrayed in the universally recognized 4×3 rectangular matrix which divides the twelve keys into four equidistant and parallel, horizontally arrayed rows 1, 2, 3, and 4 having three keys in each row. The three aligned keys in each row 1-4 are equidistant and form three vertically arrayed columns 5, 6 and 7. Beginning at the first key in row 1, continuing along row 1 and back to the first key in row 2 and so forth, the twelve keys are consecutively numbered from 1 through 9. The "star" key, zero key and pound sign key occupy the three keys in row 4. It will be recognized by those skilled in the art that other key pad arrangements are used and that the matrix of the present invention may be adapted for use with other keypad configurations.

The matrix 28 in FIG. 2 defines 12 openings corresponding in size and location to the twelve keys of the keypad 26 so that the matrix 28 may be placed over the keys as in FIG. 3.

Figure 4:
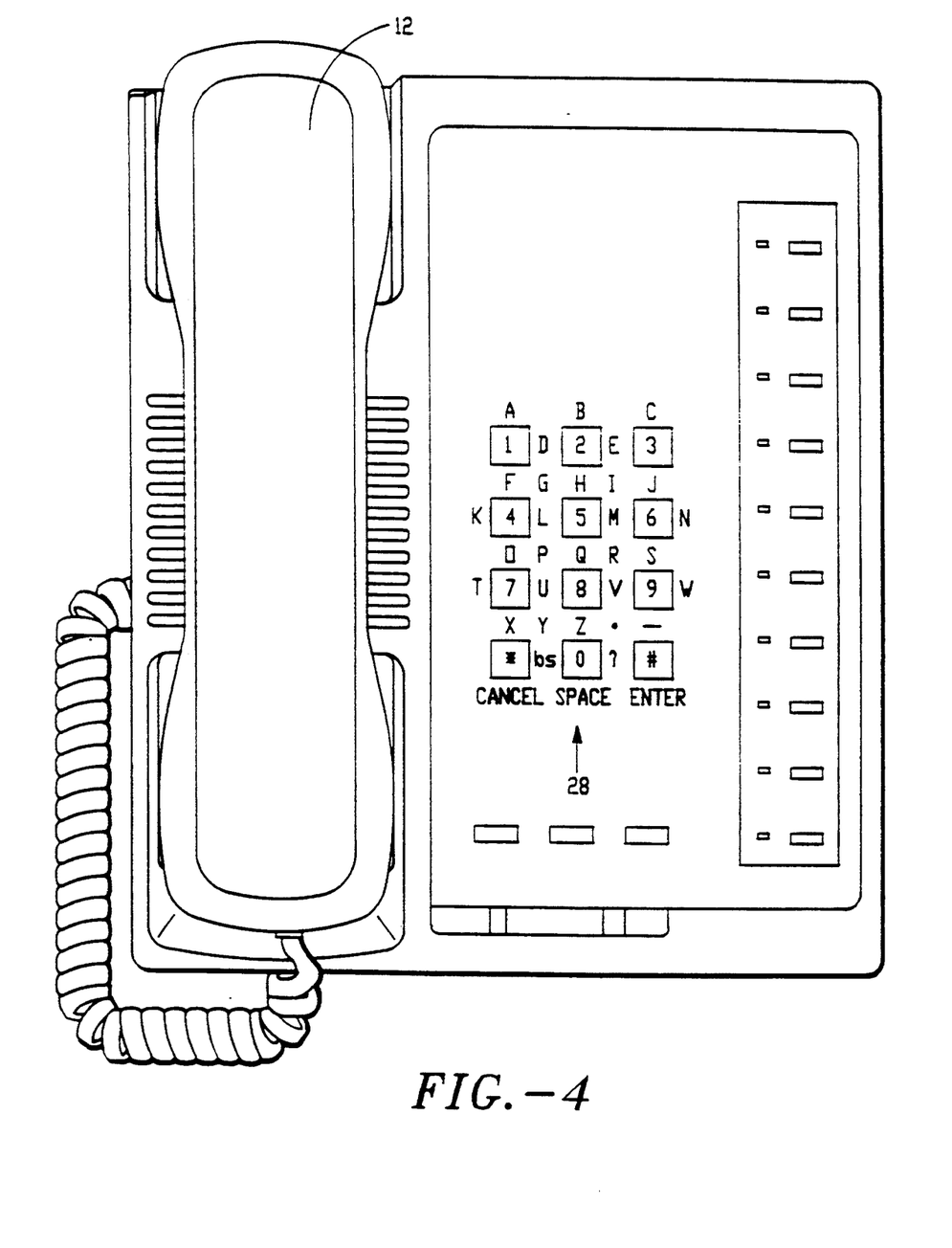
FIG. 4 is a top plan view of the conventional push button telephone of FIG. 3 showing configuration of the characters directly upon the keypad.

The 26 letters of the English alphabet are singly and progressively prearranged above, below, and between the twelve openings in matrix 28. Each letter occupies a separate site on the matrix 16. As can be seen in FIG. 3, several optional special characters, such as a period, a hyphen, and a question mark are included on the matrix. Cancel, space and enter functions are provided in row 4. Other special characters may be substituted for those shown in FIG. 3. The characters may also be directly configured upon the keypad as shown in FIG. 4A.

All of the characters contained on matrix 28 are entered by sequentially pressing a keypair. Each keypair is defined and coded into memory using the physical location of the particular character on the matrix. The DTMF voice recognition feature of the invention requires that the keypair be entered using two sequential keystrokes. The entry of a keypair is viewed as logical by the user in that it is dependent only upon the position of the character upon the matrix. The method is bidirectional in that the keypair for each character may be pressed in any order to access the corresponding binomial code.

Letter characters that are located adjacent to only one key, (A,B,C,K,N,T, and W) have a single key keypair and are entered by pressing the corresponding adjacent key twice. Characters that are located between and adjacent to two keys, (D,E,F,H,J,L,M,O,Q,-S,U,V,X,Z, bs, ?, and the hyphen) have two key keypairs and are entered by sequentially pressing the two adjacent keys in any order to form the correct keypair. Characters that are located between and adjacent to four keys, (G,I,P,R,Y, and the period) have two, two key keypairs and are entered by sequentially pressing any two diagonally adjacent keys in any order.

Figure 5:
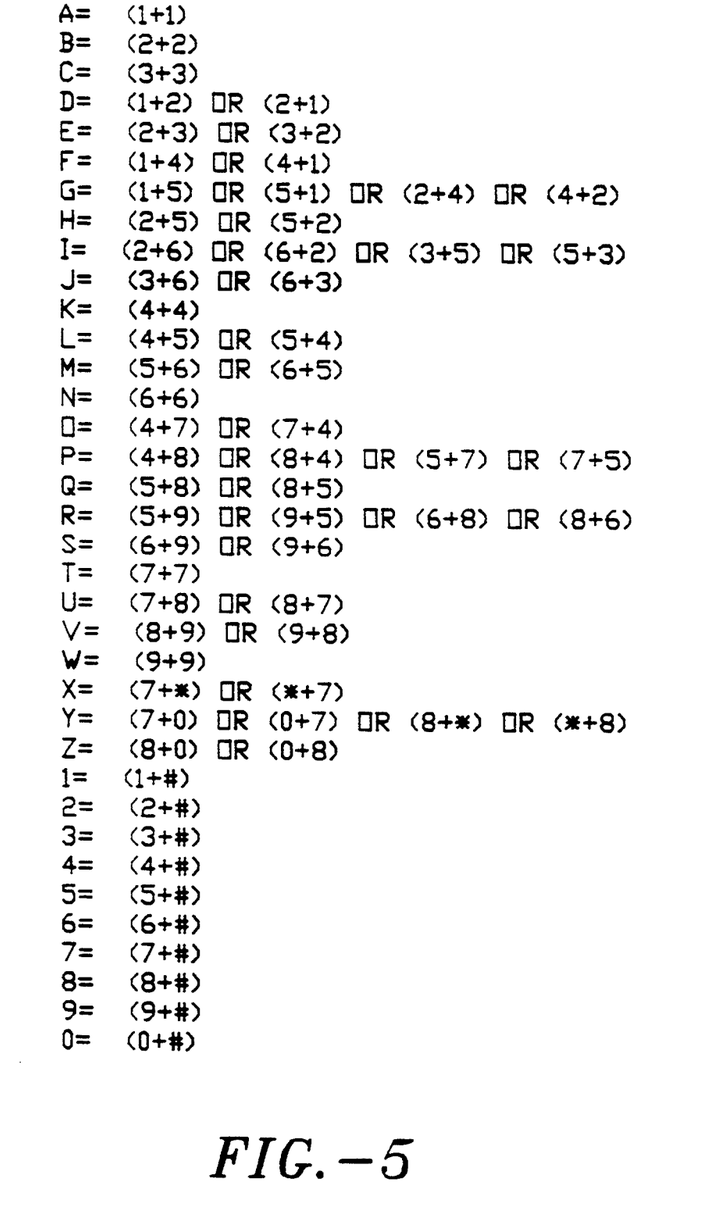
FIG. 5 is a table showing the keypair entry sequence for each of the alphanumeric characters shown in the matrix in FIG. 3.

The cancel, space and enter functions have keypairs that are entered by pressing the respective adjacent key twice or by pressing the respective adjacent key once, followed by a pause. The sequences for entering all of the characters shown on matrix 28 are included in table form in FIG. 5.

The present invention permits the user to enter alphabetical and numeric characters within the same set of characters, for example, to enter a credit card number containing both letters and numbers. To enter the numeric character, the corresponding numeric key is pressed followed by the pressing of the "pound" sign key, or alternatively, by the pressing of any key that is located at least two rows or two columns distance from the numeric key. Referring now to FIG. 4 for example, the number 1 may be entered by pressing the number one key and by pressing any of the following keys: "star" zero pound or 3. Alternatively, the number 1 may be entered by pressing the correspondingly numbered key followed by a pause of sufficient duration to receive the tone signal "echo."

Referring now to FIG. 1, the voice modem module 16 is included for providing voice prompts to the caller and is typically installed within the conventional computer 18 which further includes a storage memory 20, a voice synthesizer 22, and a decoder 24. Voice prompts may also be sent directly from the voice synthesizer 22 through the computer 18 to the caller.

The memory 20 contains stored, binomial codes corresponding to the voice DTMF signals of the keys of the hand set 12. The stored codes are used by the computer 18 as a look-up table. The decoder 24 uses the stored codes to convert the analog DTMF voice signals into digital data for processing and storage. System 10 also generates responsive voice messages by converting stored digital code into analog signals.

The conventional computer 18 is further connected to a service provider computer 21 such as facsimile equipment, a paging system computer, a bank computer, and/or an E-mail system. The service provider computer 21 may further communicate with another device 23 for ultimate receipt of the message. The other device may be a remote pager, a data base, a subscriber receiving unit, etc.

Figure 6:
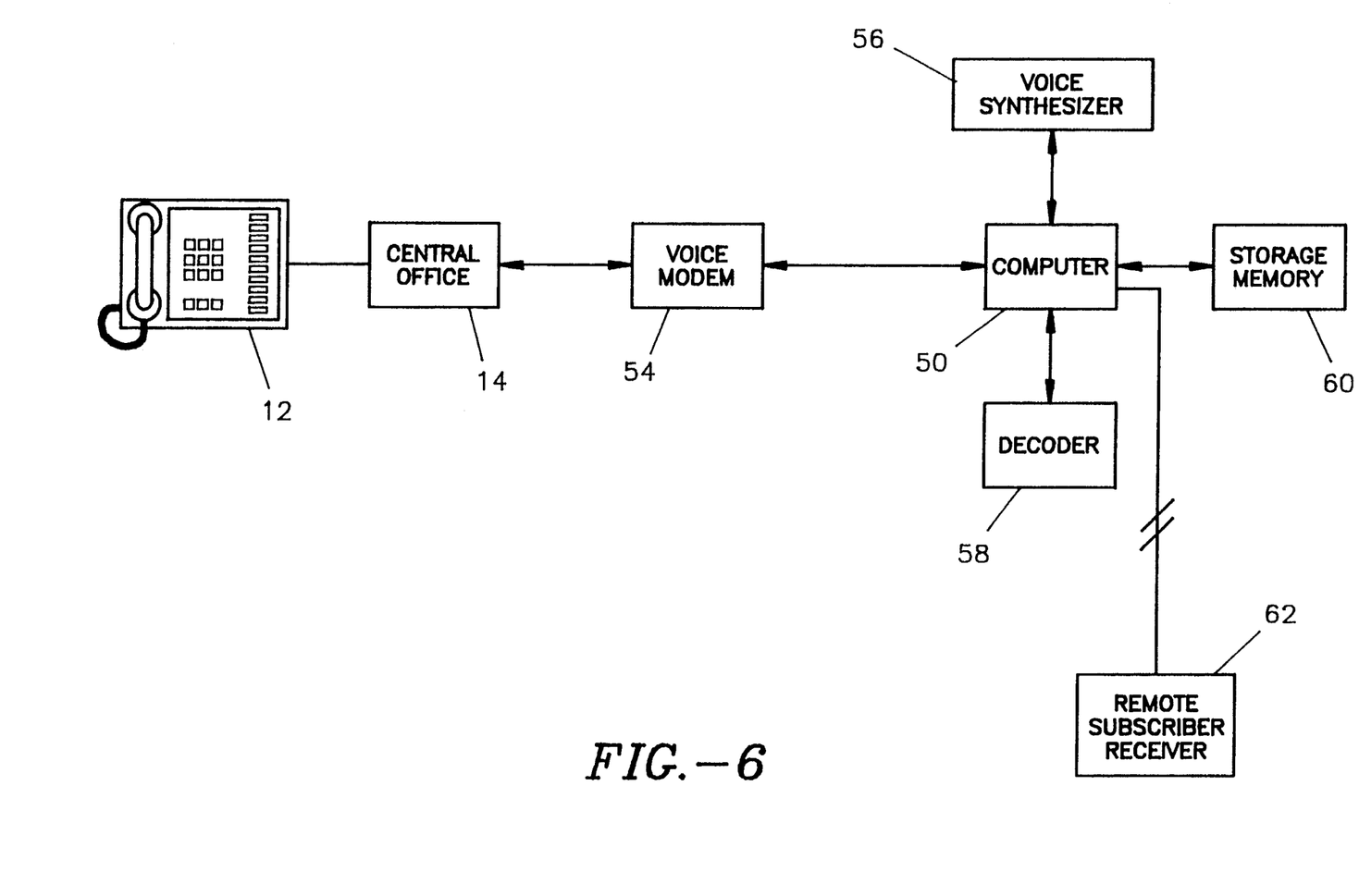
FIG. 6 is a block diagram of a handset connected to a telephone central office having an on site E-mail computer system which is in turn connected to a remote site subscriber receiving unit.

Referring now to FIG. 6, the handset 12 is shown connected through the telephone central office 14 and a voice modem 54 to an on site computer 52 of, for instance, an E-mail system 50 which processes and stores the message as described above. The E-mail computer 52 typically includes a voice synthesizer 56, a decoder 58, and a storage memory 60. A remote subscriber receiving system 62 is in turn connected to the E-mail computer 52.

The decoder 24 of system 10 includes software or firmware that is programmed to provide digital, binomial code characters for each letter of the alphabet and the desired special characters. In addition to storing codes for converting the analog voice signals to digital signals, stored digital files may be converted to analog voice signals in order to enunciate a message back to the user or to enunciate a message to the service provider computer 21. Known programs and hardware may be used to accomplish the digital voice storage capability and transmission capability as described in co-pending application No. 07/500,370, hereby incorporated by reference. The preferred embodiment includes a Dialogics (tm) voice board and associated software to provide the binomial, digital codes for each special character and each alphabetical character. Standard communications software, such as SilverWare Async (tm), may be used for the communications programs. Software is also provided to allow communication between the central file server computer 18 and the service provider computer. The computers used are IBM compatible.

Figure 7:
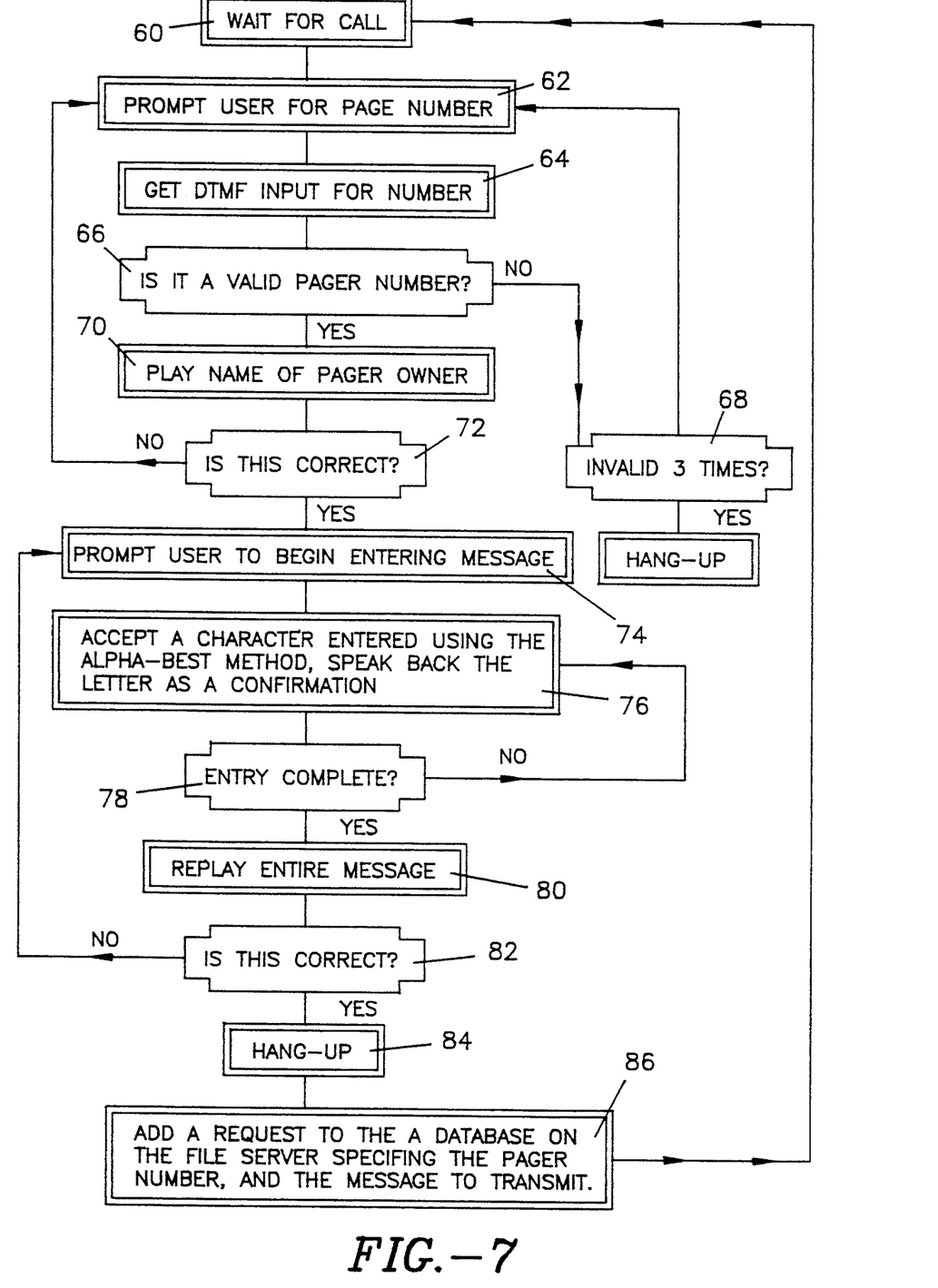
FIG. 7 is a flow chart showing the method of entering a message into the central computer for storage and subsequent delivery to a service provider computer.

Referring now to FIG. 7, a typical method for central computer processing of an incoming alphanumeric message for a paging system computer is shown. It will be recognized by those skilled in the art that, in alternative embodiments, the incoming message could be intended for an E-mail system or any other general messaging device.

At step 60, the computer 18 waits for an incoming call which activates the voice prompt at step 62 to request the caller to enter the desired pager number. Upon receipt of the DTMF signals at step 64, the decoder 24 processes the signals and determines whether such a number is stored as a valid pager number at step 66. If the number is not a valid number, the voice prompt is repeated a predetermined number of times at step 68 to request re-entry of the number. If a valid number is entered, the voice prompt plays the name of the pager owner at step 70 and asks the caller if the name is correct at step 72. If the name is incorrect, the system returns to step 62. A correct name causes the voice prompt to ask the user to enter the desired alphanumeric message using the binomial codes described above for each alphabetical character at step 74. Entered characters and numerals are accepted and enunciated back to the caller at step 76. The caller is asked whether the message is complete at step 78 and the message is replayed and confirmed at steps 80 and 82, respectively. The caller then goes off hook at step 84, and the message is stored by pager number at step 86 for later transmission to the pager system computer.

Figure 9:
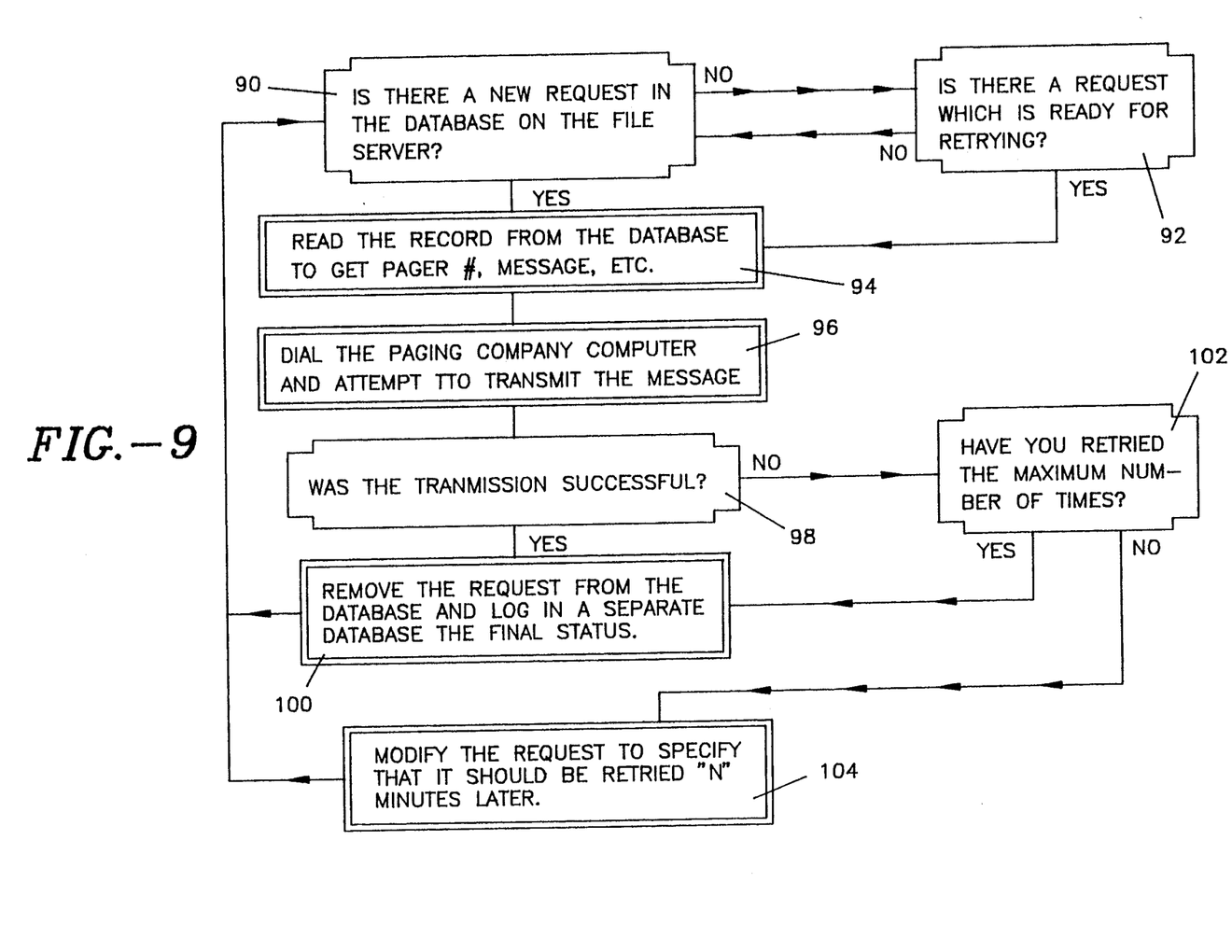
FIG. 9 is a flow chart showing the steps for transferring a message from the central computer to the service provider computer.

Referring now to FIG. 9, the sequence for delivering the stored message in FIG. 7 from the computer 18 to the paging company computer 21 is shown. At step 90, the computer 18 checks the database to determine whether a new message has been entered for delivery to the paging company. In the absence of a new message, the computer 18 checks the database to see if a previous message has not been successfully delivered such that delivery should be retried at step 92. At step 94, the computer 18 reads the new message, or the undelivered message, to obtain the pager number and message. The computer 18 then dials the paging company computer and attempts to deliver the message at step 96. If the transmission is successful at step 98, the message is removed from the delivery database at step 100 and the system returns to step 90. If the transmission is unsuccessful, at step 102 the computer 18 checks whether the maximum number of preselected transmission attempts has been reached, and the message is either removed at step 100, or modified at step 104 for return to the database.

Figure 8:
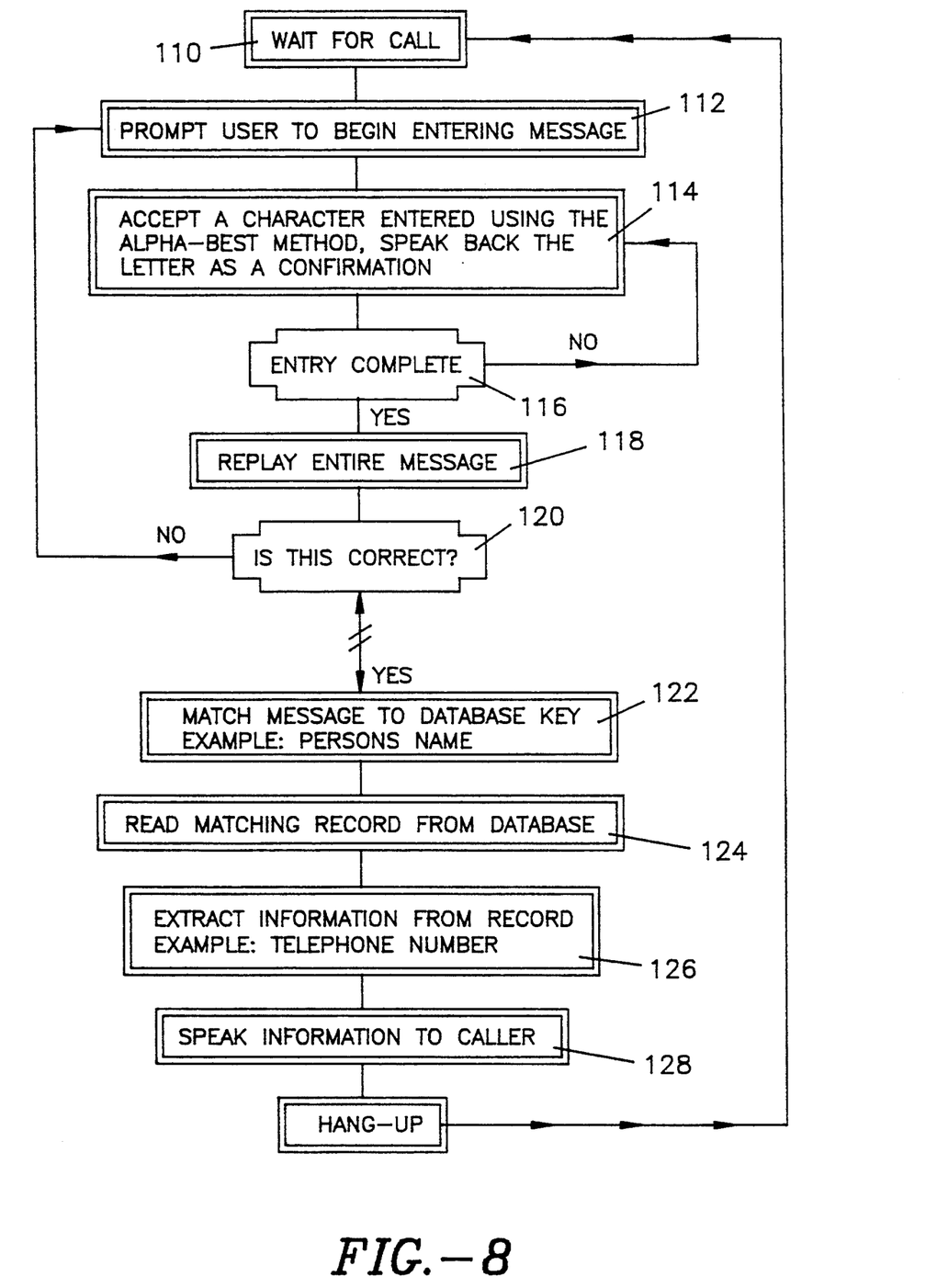
FIG. 8 is a flow chart showing delivery of the message from the central computer to the service provider computer while the caller remains on hook.

Referring now to FIG. 8, a typical method for direct delivery of a message to a service provider and return of an answer from the service provider to the on hook caller is shown. The sequence shown in FIG. 8 is particularly suitable for transaction oriented information such as obtaining a bank balance, stock quotation, airline information, or any other data base information accessible by through telephone lines. At step 110, the computer 18 receives an incoming call, and the user is prompted to enter a message, typically in the form of a query, at step 112. The message is entered using the binomial codes discussed above, and the computer 18 decodes the entered characters and speaks them back to the caller at step 114. Following confirmation that the message is complete at step 116, the message is replayed at step 118, and confirmed at step 120. At step 122, the message is matched to the information data base access records. The matching record is read from the information data base at step 124. At step 126, the desired information is extracted from the database, and at step 128 the desired information is spoken to the caller.

It will be recognized by those skilled in the art that the stored message may also be sent to any other conventional messaging equipment, such as voice mail, E-mail, or bank computers.

It will be recognized by those skilled in the art that each of the prearranged alphanumeric characters may be assigned to a single key on a separate keyboard which may be attached to a telephone unit. In this aspect, the keypair DTMF signal for each character is generated by pressing a single key. The separate keyboard may be provided with an alpha display which enables the user to view the selected entries.

In accordance with another aspect of the present invention, programming creates intelligent voice cards which directly echo the selected character back to the user without the necessity for prior decoder conversion and reconversion.

INDUSTRIAL APPLICABILITY

The present invention may be used in the general messaging industry employing conventional telephone keypads. The present invention finds special application for entering alphanumeric messages into facsimile devices, E-mail systems, paging systems, information depository computers, bank computers, etc.

Although the presently preferred embodiment of the invention has been illustrated and discussed herein, it is contemplated that various changes and modifications will be immediately apparent to those skilled in the art after reading the foregoing description in conjunction with the drawings. Accordingly, it is intended that the description herein is by way of illustration and should not be deemed limiting the invention, the scope of which being more particularly specified and pointed out by the following claims.

What is claimed is:

1. A matrix for entering alphanumeric characters into a first computer means for delivery to a service provider computer means configured as a facsimile system, the matrix comprising a pattern of characters prearranged on a conventional telephone keypad, the pattern arrayed so that only one character is placed between any two adjacent keys of the keypad.

2. The matrix of claim 1 wherein the service provider computer means is configured as a computer for a paging system.

3. The matrix of claim 1 wherein the service provider computer means is configured as a computer of a messaging system.

4. The matrix of claim 1 wherein the service provider computer means is configured as a telephone accessible data base computer.

* * * * *